US012359504B2

(12) United States Patent
Pierce et al.

(10) Patent No.: US 12,359,504 B2
(45) Date of Patent: Jul. 15, 2025

(54) MOTORIZED ROLLER SHADE HAVING A SMART HEMBAR

(71) Applicant: Lutron Technology Company LLC, Coopersburg, PA (US)

(72) Inventors: Reginald Pierce, Coopersburg, PA (US); Garrett Powell, Coopersburg, PA (US); Thomas F. Rebbert, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/925,920

(22) Filed: Jul. 10, 2020

(65) Prior Publication Data

US 2021/0010326 A1 Jan. 14, 2021

Related U.S. Application Data

(60) Provisional application No. 62/873,294, filed on Jul. 12, 2019.

(51) Int. Cl.

*E06B 9/82* (2006.01)
*E06B 9/68* (2006.01)
*E06B 9/72* (2006.01)

(52) U.S. Cl.

CPC .................. *E06B 9/82* (2013.01); *E06B 9/72* (2013.01); *E06B 2009/6809* (2013.01); *E06B 2009/6818* (2013.01); *E06B 2009/6827* (2013.01)

(58) Field of Classification Search

CPC ............... E06B 9/82; E06B 2009/6809; E06B 2009/6818; E06B 2009/6827;

(Continued)

(56) References Cited

U.S. PATENT DOCUMENTS 6,201,364 B1 3/2001 Will et al.
6,369,530 B2 * 4/2002 Kovach .................... E06B 9/32 388/933

(Continued)

FOREIGN PATENT DOCUMENTS

CN 101663458 A 3/2010
CN 102587818 A † 7/2012

(Continued)

OTHER PUBLICATIONS

International Search Report and Written Opinion of corresponding International Application No. PCT/US2020/41481, dated Oct. 12, 2020.

(Continued)

*Primary Examiner* — Daniel P Cahn
*Assistant Examiner* — John W Hanes, Jr.
(74) *Attorney, Agent, or Firm* — Duane Morris LLP

(57) ABSTRACT

A motorized window treatment includes a motor drive unit having a motor and a covering material having a first end in a fixed position and a second end movable along a first axis. The covering material is configured to be extended along a first axis when the motor is operated in a first direction and retraced along the first axis when the motor is operated in a second direction. A hembar is coupled to the second end of the covering material. At least one state sensing circuit is coupled to the hembar and is configured to generate at least one first signal. A control circuit is configured to determine a present state of the hembar based on the at least one first signal. The motor drive unit is configured to control the motor when the present state of the hembar and an expected state of the hembar are different.

31 Claims, 7 Drawing Sheets

(58) Field of Classification Search
CPC ..... E06B 2009/6836; E06B 2009/6845; E06B 2009/885
See application file for complete search history.

(56) References Cited

U.S. PATENT DOCUMENTS

| | | | | |
|---|---|---|---|---|
| 7,281,565 | B2 | 10/2007 | Carmen, Jr. et al. | |
| 7,723,939 | B2 | 5/2010 | Carmen, Jr. | |
| 7,737,653 | B2 | 6/2010 | Carmen, Jr. et al. | |
| 8,950,461 | B2 | 2/2015 | Adams et al. | |
| 9,488,000 | B2 | 11/2016 | Kirby et al. | |
| 9,725,948 | B2 * | 8/2017 | Mullet | E06B 9/72 |
| 10,072,460 | B2 | 9/2018 | Cavarec et al. | |
| 10,098,074 | B2 | 10/2018 | Baker et al. | |
| 10,113,360 | B2 | 10/2018 | Hall et al. | |
| 10,599,174 | B2 | 3/2020 | Baker et al. | |
| 2016/0017656 | A1 * | 1/2016 | Adreon | E06B 9/68 160/7 |
| 2017/0204661 | A1 * | 7/2017 | Dann | E06B 9/368 |
| 2017/0284157 | A1 * | 10/2017 | Blair | G01C 9/06 |
| 2018/0283099 | A1 * | 10/2018 | Cooper | G05B 15/02 |
| 2018/0310745 | A1 | 11/2018 | Giri et al. | |
| 2019/0131898 | A1 * | 5/2019 | Rivera | E06B 9/322 |

FOREIGN PATENT DOCUMENTS

| | | | | | |
|---|---|---|---|---|---|
| CN | 103161377 | A | | 6/2013 | |
| CN | 205532204 | U | | 8/2016 | |
| CN | 205840728 | U | | 12/2016 | |
| CN | 207194779 | U | | 4/2018 | |
| EP | 2354424 | | | 8/2011 | |
| EP | 3040506 | | | 7/2016 | |
| JP | 5-30766 | A | † | 2/1993 | |
| JP | 2017-186807 | A | † | 10/2017 | |
| JP | 2017186807 | | | 10/2017 | |
| WO | 2017050810 | | | 3/2017 | |
| WO | WO-2017050810 | A1 | * | 3/2017 | E06B 9/26 |

OTHER PUBLICATIONS

First Office Action issued in corresponding Chinese Patent Application No. 202080063762.X dated Apr. 8, 2023, 13 pages.
Second Office Action issued in corresponding Chinese Patent Application No. 202080063762.X dated Jan. 31, 2024, 18 pages.
Decision of Rejection issued in corresponding Chinese Patent Application No. 202080063762.X dated Jun. 8, 2024, 21 pages.
Official Action issued in corresponding European Patent Application No. 20746522.0 dated Oct. 28, 2024, 6 pages.

* cited by examiner
† cited by third party

MOTORIZED ROLLER SHADE HAVING A SMART HEMBAR

CROSS-REFERENCE TO RELATED APPLICATIONS

This application claims the benefit of U.S. Provisional Appl. Ser. No. 62/873,294, entitled "Motorized Roller Shade having a Smart Hembar," filed Jul. 12, 2019, which is incorporated by reference herein in its entirety.

BACKGROUND

Motorized roller shades may include a covering material coupled to a roller tube that can be rotated by a motor to raise or lower the covering material. The motor may be operated by a user without being in visual range of the motorized roller shade, for example, by a switch or other control device located away from the motorized roller shade. If the motorized roller shade is assembled with a lower edge (referred to as a hembar) not level with the roller tube (e.g., substantially parallel to an axis of rotation of the roller tube), the covering material may not wind around the roller tube correctly as the covering material is raised. This phenomenon is called "telescoping" since the covering material extends farther over one end of the roller tube with each rotation of the roller tube as the covering material rolls up onto the roller tube (e.g., like a telescope). When the covering material extends over the end of the roller tube, the side edges of the covering material may be damaged if the side edges contact the mounting brackets or other structure, such as the sides of the window frames. Damage of the covering material may lead to a poor experience for the customer and require replacement of the motorized roller shades.

In addition, issues may arise if the hembar contacts an obstacle while the covering material is being lowered. For example, a motorized roller shade may be installed above a door and/or window that may open into the space in which the motorized roller shade is installed, thus creating an obstacle in the way of the covering material. When the covering material is being lowered, a portion of the hembar may contact the obstacle and may not be able to move lower causing the hembar to become unlevel. Since the motor drive unit does not know that there is an obstacle in the way of the hembar, the motor drive unit may continue to try to lower the covering material resulting in the creation of loose portions of the covering material that are unaesthetically pleasing.

Additionally, if there is slack in the covering material near the roller tube when the motor drive unit begins to raise the covering material, the slack may be wound around the roller tube (e.g., a loop of the covering material may be wrapped into the layers of covering material wound around the roller tube). This may cause the covering material to appear shorter than covering materials of adjacent motorized roller shades. Since the motor drive unit may not be aware that the covering material is now "shorter," the motor drive unit may rotate the roller tube until the hembar winds up around the roller tube, causing the hembar to get stuck around the roller tube and/or the motor drive unit to lose the present position and/or limits of the covering material. If there is a loop of the covering material wrapped into the layers of covering material wound around the roller tube when the motor drive unit is rotating the roller tube to lower the covering material, the covering material and the hembar may drop rapidly (e.g., a "short jerk" event) when the roller tube is rotated to the location of the loop in the wound fabric, which is an undesirable occurrence.

SUMMARY

In various embodiments, a motorized window treatment is disclosed. The motorized window treatment may include a motor drive unit and a covering material that may have a first end in a fixed position and a second end movable along a first axis. The covering material may be configured to be extended along the first axis when the motor is operated in a first direction and retracted along the first axis when the motor is operated in a second direction. A hembar may be coupled to the second end of the covering material. The hembar may include at least one state sensing circuit configured to generate at least one first signal indicative of. A control module may be configured to determine a present state of the hembar based on the at least one first signal. The motor drive unit may be configured to control the motor when the present state of the hembar and an expected state of the hembar are different.

In various embodiments, a method of operating a motorized window treatment is disclosed. The method may include a step of receiving, by a control circuit, at least one first signal from a first state sensing circuit coupled to a hembar. The hembar may be coupled to a covering material having a first end in a fixed position and a second end movable along a first axis. A present state of the hembar may be determined based on the at least one first signal. The motor drive unit may control operation of a motor when the present state of the hembar and an expected state of the hembar are different. The motor may be configured to move at least the second end of the covering material on a first axis.

In various embodiments, a method (e.g., a method of configuring a motorized window treatment) is disclosed. The method may include a step of placing a motorized window treatment in a first state. The motorized window treatment may include a motor drive unit including a motor, a covering material having a first end in a fixed position and a second end movable along a first axis, and a hembar coupled to the second end of the covering material. A control circuit may store the first state of the motorized window treatment. The motor drive unit may operate the motor to move the second end of the covering material in a first direction. The control circuit may be configured to receive at least one first signal indicative of operation of the motor drive unit. The control circuit may receive at least one second signal indicative of a second state of the motorized window treatment. The motor drive unit may operate the motor to stop movement of the covering material. The control circuit may store the second state of the motorized window treatment.

BRIEF DESCRIPTION OF THE DRAWINGS

The features and advantages of the present disclosure will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
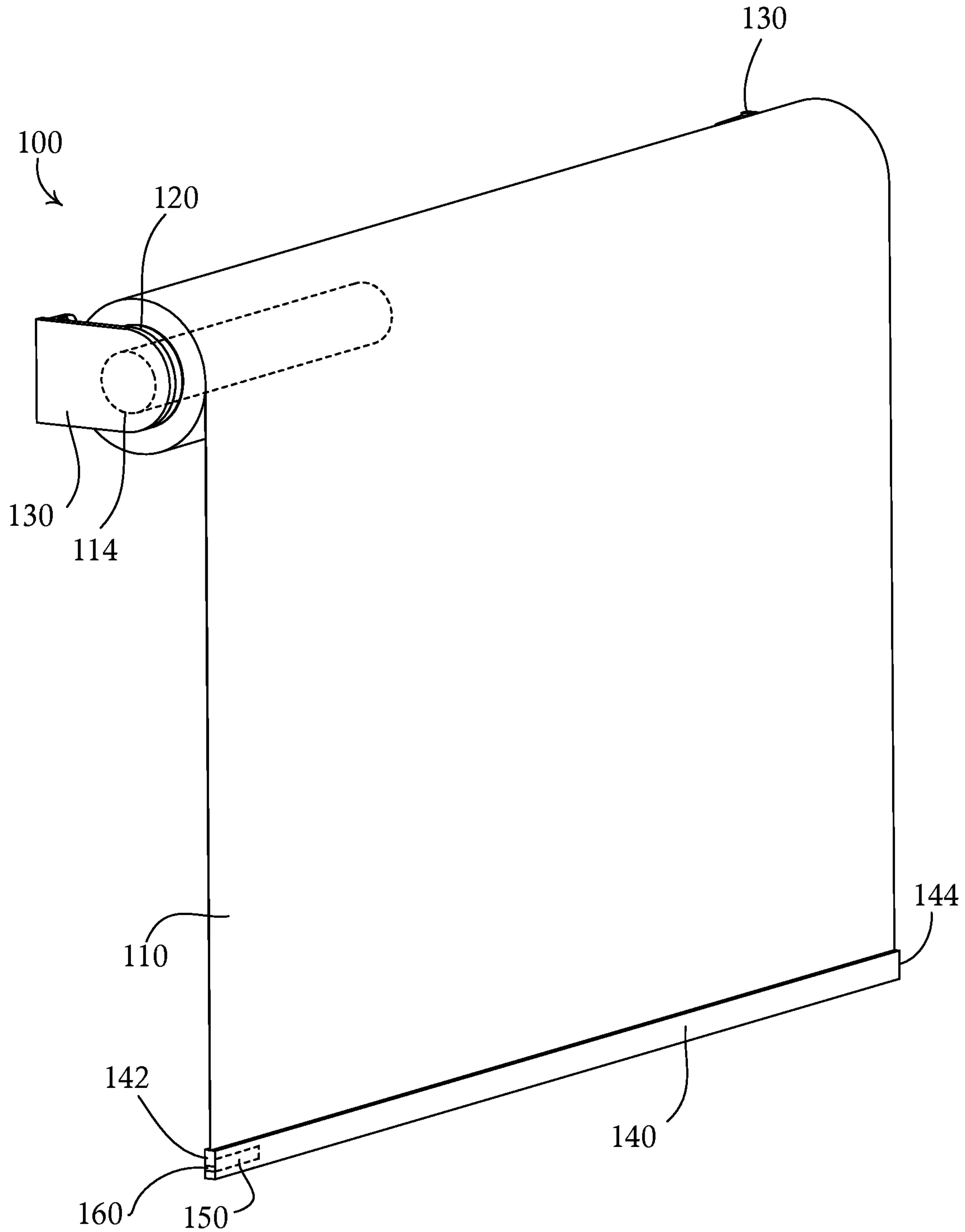
FIG. 1 illustrates a perspective view of a motorized window treatment configured to detect and respond to at least one state or state change, in accordance with some embodiments.

The description of the preferred embodiments is intended to be read in connection with the accompanying drawings, which are to be considered part of the entire written description of this disclosure. The drawing figures are not necessarily to scale and certain features of the disclosure may be shown exaggerated in scale or in somewhat schematic form in the interest of clarity and conciseness. In this description, relative terms such as “horizontal,” “vertical,” “up,” “down,” “top,” “bottom,” as well as derivatives thereof (e.g., “horizontally,” “downwardly,” “upwardly,” etc.) should be construed to refer to the orientation as then described or as shown in the drawing figure under discussion. These relative terms are for convenience of description and normally are not intended to require a particular orientation. Terms including “inwardly” versus “outwardly,” “longitudinal” versus “lateral” and the like are to be interpreted relative to one another or relative to an axis of elongation, or an axis or center of rotation, as appropriate. Terms concerning attachments, coupling and the like, such as “connected” and “interconnected,” refer to a relationship wherein structures are secured or attached to one another either directly or indirectly through intervening structures, as well as both moveable or rigid attachments or relationships, unless expressly described otherwise. The term “operatively coupled” is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

FIG. 1 illustrates a perspective view of an example motorized window treatment, such as a motorized roller shade 100. The motorized roller shade 100 may be configured to detect and respond to at least one state or state change, in accordance with some embodiments. The motorized roller shade 100 may include a covering material 110 (e.g., a flexible material, such as a shade fabric) windingly received around a roller tube 120. The roller tube 120 may be rotatably supported by mounting brackets 130, which may be attached to a wall or ceiling adjacent to a window that may be covered by the covering material 110. A hembar 140 may be connected to a lower edge of the covering material 110 and oriented parallel to the lower edge of the covering material 110. The hembar 140 may extend from a first end 142 to a second end 144. The hembar 140 may be configured to weigh down the covering material 110 and provide an aesthetically-pleasing cover over the lower edge of the covering material 110. A motor drive unit 114 may include a motor configured to rotate the roller tube 120 to raise and lower the covering material 110 along a first axis between a fully-closed position and a fully-open position. In some embodiments, the motor drive unit 114 may be positioned within a space defined by the roller tube 120.

In some embodiments, the motorized roller shade 100 may comprise a control module 150 configured to detect one or more states and/or state changes of the motorized roller shade 100. For example, the control module 150 may be configured to detect movement of the hembar 140, orientation of the hembar 140 (including horizontal, axial, or vertical orientation), and/or any other suitable state of the hembar 140, operation of the motor drive unit 114, a position of the motor, and/or any other suitable state of the motor, to list only a few non-limiting examples. The control module 150 may be positioned within the hembar 140, within the roller tube 120, within any other suitable portion of the motorized roller shade 100, and/or combinations thereof. In some embodiments, the control module 150 and/or portions of the control module 150 may be positioned remotely from the motorized roller shade 100. The hembar 140 may include a removeable battery tray and/or compartment 160 located in the first end 142 of the hembar 140 to allow for replacement of one or more batteries and/or other power sources. Although some embodiments are discussed herein with reference to the motorized roller shade 100, it will be appreciated that the systems and methods disclosed herein may be applied to any suitable motorized window treatment.

Figure 2:
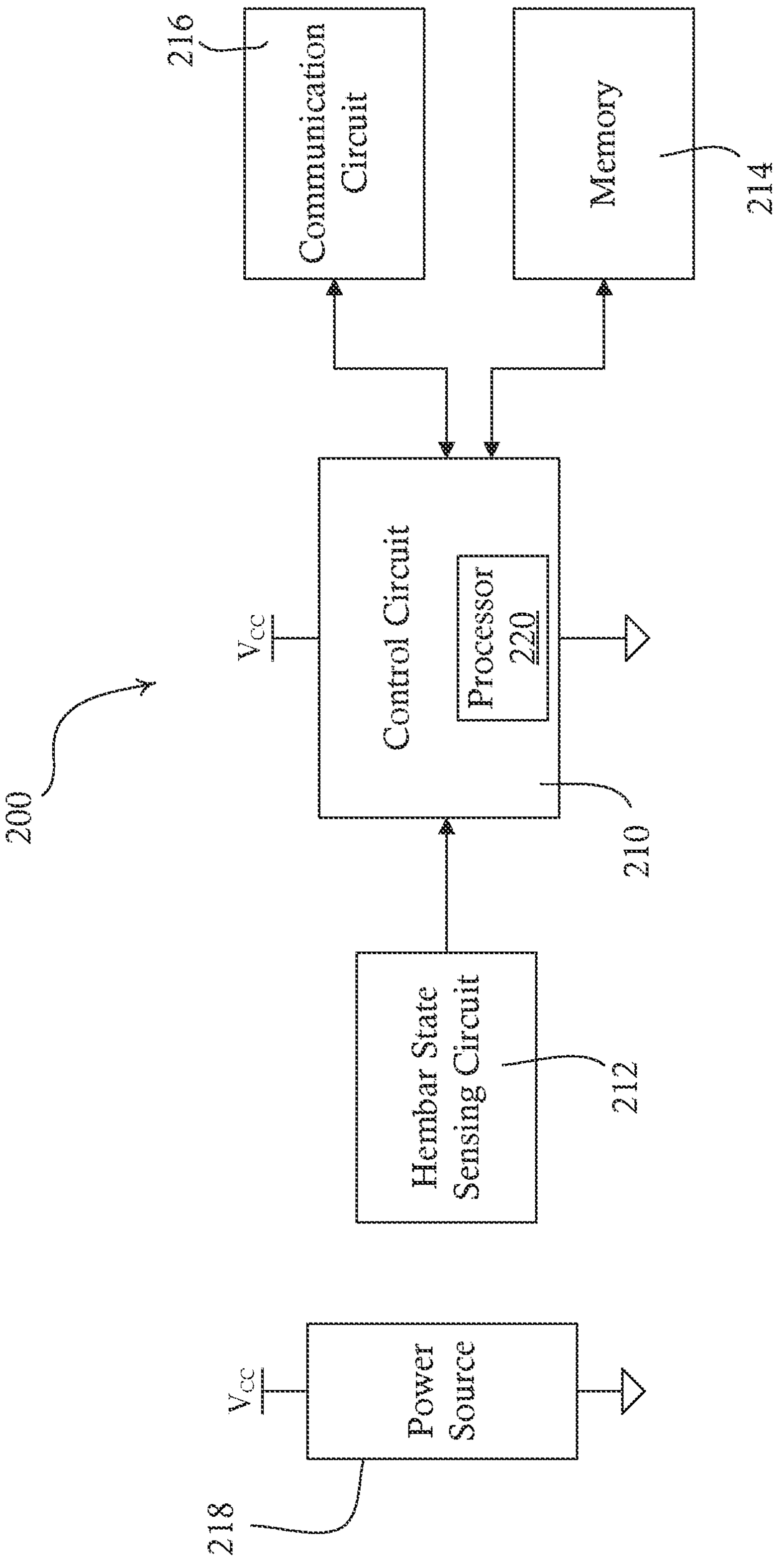
FIG. 2 illustrates a simplified block diagram of a control module, in accordance with some embodiments.

FIG. 2 is a simplified block diagram of a control module 200 (e.g., the control module 150 of the motorized roller shade 100 shown in FIG. 1), in accordance with some embodiments. The control module 200 is a representative device and may include a control circuit 210, one or more hembar state sensing circuits 212, a memory 214 (e.g., a non-transitory computer-readable storage medium), a communication circuit 216, and a power source 218. In some embodiments, one or more than one of the control module 200 components may be combined or omitted such as, for example, combining the control circuit 210 with the memory 214 and/or the communication circuit 216. In some embodiments, the control module 200 may include other components not combined or included in those shown in FIG. 2. In other embodiments, the control module 200 may also comprise an input/output subsystem that may include, for example, a user interface (not shown). In other embodiments, the control module 200 may include several instances of the components shown in FIG. 2. For example, the control module 200 may include multiple control circuits 210. For the sake of conciseness and clarity, and not limitation, one of each of the components is shown in FIG. 2.

The control circuit 210 may include a processor circuit 220 operative to control the operations and performance of the motorized roller shade 100 and/or a subset of the motorized roller shade 100. The control circuit 210 may include any suitable processing circuitry, such as, for example, a microprocessor, e.g., a complex instruction set computer (CISC) microprocessor, a reduced instruction set computing (RISC) microprocessor, and/or a very long instruction word (VLIW) microprocessor, a programmable logic device (PLD), a microcontroller, an application specific integrated circuit (ASIC), a field programmable gate array (FPGA), a chip multiprocessor (CMP) or any suitable processing device or control circuit. Similarly, the hembar state sensing circuit 212 may include any suitable state sensing element, such as, for example, one or more of an accelerometer, a gyroscope, a proximity sensor (e.g., capacitive, microwave, ultrasonic, inductive, magnetic, optical, radar, sonar, fiber optic, Hall effect, and piezoelectric, to list only a number of non-limiting examples), a motion sensor (e.g., microwave, ultrasonic, accelerometer, gyroscope), a force balance sensor, a micro-electrical-mechanical systems sensor, a fluid-filled sensor, and/or other suitable sensor or sensing circuit. The control module 200 may include a single hembar state sensing circuit 212 or multiple hembar state sensing circuits 212. In some embodiments, multiple hembar state sensing circuits 212 may be spaced along a length of the hembar 140 at regular and/or irregular spacing intervals. A hembar, such as hembar 140, including one or more components of the control module 200 may be referred to as a "smart hembar." A smart hembar may include any suitable components of the control module 200, such as, for example, one or more hembar state sensing circuits 212, memory 214, communication circuit 216, processor 220, and/or any other suitable components of the control module 200.

In some embodiments, the motorized roller shade 100 may include and/or be in communication with multiple control modules 150. For example, in some embodiments, a first control module may be located at the first end 142 of the hembar 140 and a second control module may be located at the second end 144 of the hembar 140. In various embodiments, a control circuit (e.g., the control circuit 210) of each of the first and second control modules may be configured to receive input from at least one state sensing circuit (e.g., the state sensing circuit 212), the motor drive unit 114 via a communication circuit, and/or any other suitable input source.

In some embodiments, the communication circuit 216 may be configured to provide signal communication between the control circuit 210 and one or more additional devices or elements, such as, for example, the motor drive unit 114, a remote control (not shown), and/or any other suitable device or element. The communication circuit 216 may include any suitable hardware, software, or combination of hardware and software that is capable of coupling the control module 200 to one or more networks and/or additional devices. The communication circuit 216 may be arranged to operate with any suitable technique for controlling information signals using a desired set of communications protocols, services or operating procedures. The communication circuit 216 may comprise the appropriate physical connectors to connect with a corresponding communications medium, whether wired or wireless. In some embodiments, the control module 200 may be paired with the motor drive unit 114 (e.g., during a manufacturing process of the motorized roller shade 100 and/or during an installation process), such that the motor drive unit 114 may be responsive only to signals transmitted by the wireless communication circuit 216 of the paired control module 200 during normal operation.

In some embodiments, the communication circuit 216 may be configured to place the control module 200 in signal communication with one or more networks. In various aspects, a network may comprise local area networks (LAN), personal area networks (PAN), as well as wide area networks (WAN) including, without limitation, Internet, wired channels, wireless channels, communication devices including telephones, computers, wire, radio, optical or other electromagnetic channels, and combinations thereof, including other devices and/or components capable of/associated with communicating data.

Wireless communication modes may include any mode of communication between points (e.g., nodes) that utilize, at least in part, wireless technology including various protocols and combinations of protocols associated with wireless transmission, data, and devices. Wired communication modes may include any mode of communication between points that utilize wired technology including various protocols and combinations of protocols associated with wired transmission, data, and devices.

Accordingly, in various aspects, the communication circuit 216 may include one or more interfaces such as, for example, a wireless communications interface, a wired communications interface, a network interface, a transmit interface, a receive interface, a system interface, a component interface, a switching interface, a chip interface, a controller, and so forth. When implemented as a wireless system, for example, the communication circuit 216 may include a wireless interface having one or more antennas, transmitters, receivers, transceivers, amplifiers, filters, control logic, to list just a few potential components.

In various aspects, the communication circuit 216 may provide data communications functionality in accordance with a number of protocols. Examples of protocols may include various wireless local area network (WLAN) protocols, including the Institute of Electrical and Electronics Engineers (IEEE) 802.xx series of protocols, Wi-Fi, etc. Other examples of wireless protocols include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, 5G, etc. Further examples of wireless protocols may include wireless personal area network (PAN) protocols, such as an Infrared protocol, a Bluetooth series of protocols, etc. Yet another example of wireless protocols may comprise near-field communication techniques and protocols, such as electro-magnetic induction (EMI) techniques. An example of EMI techniques may include passive or active radio-frequency identification (RFID) protocols and devices, Ultra Wide Band (UWB) protocols, etc. Examples of wired protocols include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc.

In some embodiments, the power source 218 may be configured to generate a supply voltage $V_{CC}$ for powering the control circuit 210, the hembar state sensing circuit 212, the communication circuit 216, and/or other circuitry of the control module 200. For example, the power source 218 may include one or more batteries (e.g., coin-cell batteries), solar cells, etc. In some embodiments, the power source 218 may include multiple and/or alternative power sources, such as a solar cell attached to the hembar 140 and at least one battery.

The memory 214 (e.g., the non-transitory computer-readable medium) may include computer-executable instructions stored therein, wherein, when executed by the control circuit 210, cause the control circuit 210 to perform embodiments of the methods and processes described herein. The memory 214 may include any machine-readable or computer-readable media capable of storing data, including both volatile/non-volatile memory and removable/non-removable memory. For example, the memory 214 may include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In some embodiments, the control module 200 may be configured to monitor and/or determine at least one state and/or state change of the motorized roller shade 100. For example the control module 200 may be configured to determine if the hembar 140 is not level, if the hembar 140 has unexpectedly stopped moving, if the hembar 140 is moving at an unexpected rate and/or in an unexpected direction, and/or any other undesired or unexpected state of the hembar 140. In some embodiments, the control module 200 may be configured to control operation of the motorized roller shade 100 in response to a detected state and/or state change of the motorized roller shade 100.

Figure 3:
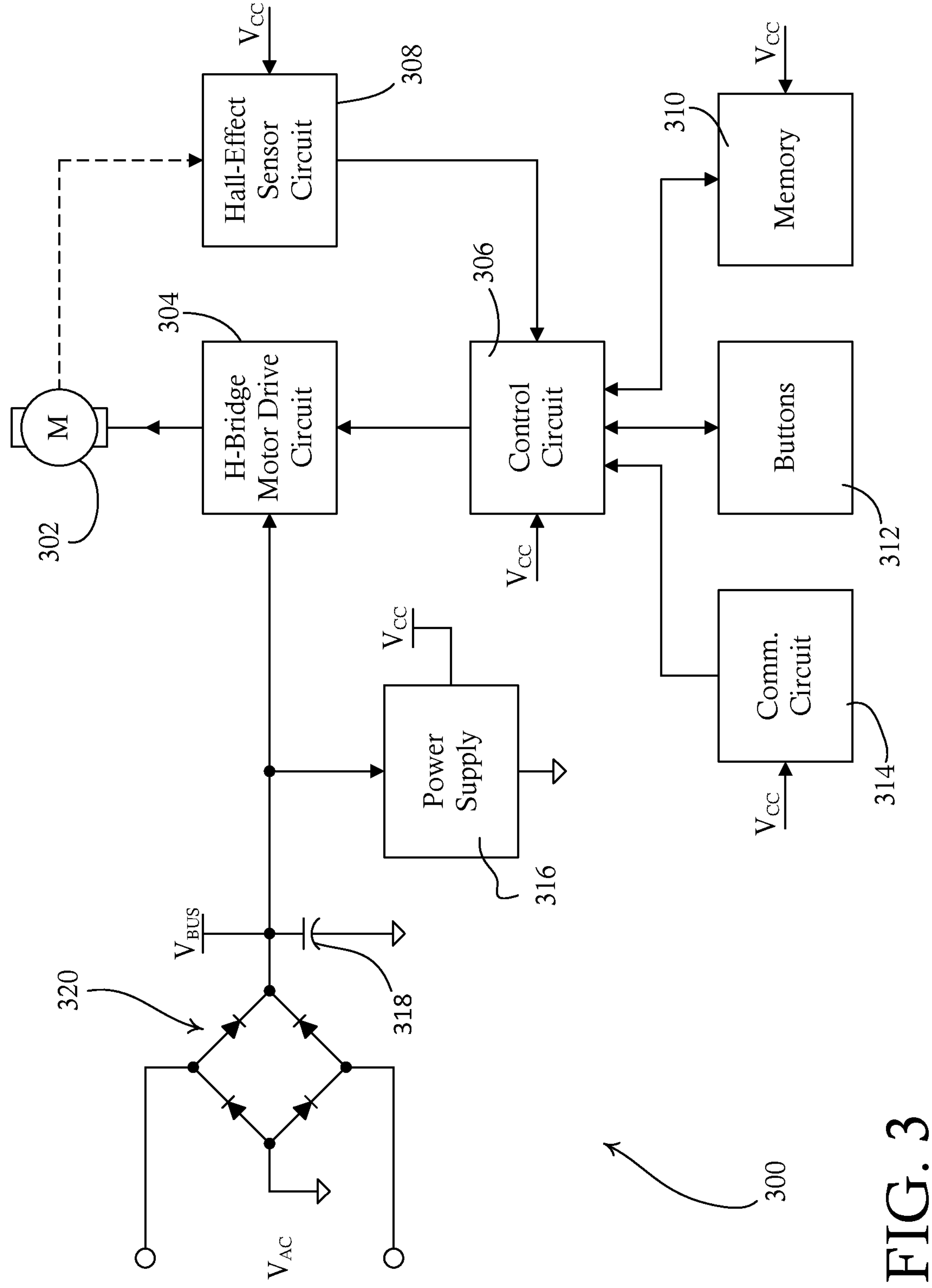
FIG. 3 illustrates a simplified block diagram of a motor drive unit of a motorized window shade, in accordance with some embodiments.

FIG. 3 is a simplified block diagram of a motor drive unit 300 (e.g., the motor drive unit 114 of the motorized window treatment 100), in accordance with some embodiments. A direct-current (DC) motor 302 may be coupled to a roller tube (e.g., the roller tube 120 of the motorized window treatment 100) and may be configured to controllably rotate the roller tube at a constant speed when a constant DC voltage or a pulse-width modulated (PWM) signal having a constant duty cycle is applied to the DC motor 302. Changing the magnitude of the DC voltage or the duty cycle of the PWM signal applied to the DC motor 302 may change the rotational speed of the motor. Further, the DC motor 302 may be configured to change the direction of rotation in response to a change in the polarity of the DC voltage or PWM signal applied to the DC motor 302.

To accomplish this level of control of the DC motor 302, the DC motor 302 may be coupled to an H-bridge motor drive circuit 304, which may be driven by a control circuit 306. The H-bridge motor drive circuit 304 may include four transistors, such as, for example, four field effect transistors (not shown). The transistors may be coupled such that, when two of the transistors are conductive, a positive DC voltage is applied to the DC motor 302 to cause the DC motor to rotate in a forward direction. When the other two transistors of the H-bridge circuit 304 are conductive, a negative DC voltage may be applied to the DC motor 302 to cause the DC motor 302 to rotate in the reverse direction. To control the speed of the DC motor 302, the control circuit 306 may drive at least one transistor of the H-bridge circuit 304 with a PWM signal. The control circuit 306 may include any suitable processing circuitry, such as, for example, a microprocessor, e.g., a complex instruction set computer (CISC) microprocessor, a reduced instruction set computing (RISC) microprocessor, and/or a very long instruction word (VLIW) microprocessor), a programmable logic device (PLD), a microcontroller, an application specific integrated circuit (ASIC), a field programmable gate array (FPGA), a chip multiprocessor (CMP) or any suitable processing device or control circuit. In some embodiments, the control circuit 306 may be similar to the control circuit 210 described in conjunction with FIG. 2, and similar description is not repeated herein.

The motor drive unit 300 may include a rotational position sensor, such as, for example, a Hall effect sensor (HES) circuit 308, which may be configured to provide information regarding the rotational speed and the direction of the DC motor 302 to the control circuit 306. The rotational position sensor may also comprise other suitable position sensors, such as, for example, optical and resistor sensors. The control circuit 306 may be configured to determine a rotational position of the DC motor 302 in response to the Hall effect sensor circuit 308. The control circuit 306 may use the rotational position of the DC motor 302 to determine a present position of the covering material (such as the covering material 110 of the motorized window treatment 100). The control circuit 306 may be coupled to a non-volatile memory 310 for storage of the present position of the covering material, the fully open position, and the fully closed position. The memory 310 may include an electrically erasable programmable read-only memory (EEPROM), although it will be appreciated that any suitable memory may be used. In some embodiments, the memory 310 may be similar to the memory 214 described in conjunction with FIG. 2, and similar description is not repeated herein.

The motor drive unit 300 may include a communication circuit 314 that allows the control circuit 134 to transmit and receive communication signals to and from a keypad and/or other motor drive units 300. In some embodiments, the communication circuit 314 may be similar to the communication circuit 216 described in conjunction with FIG. 2, and similar description is not repeated herein. The motor drive unit 200 may further include a plurality of buttons 312 that allow a user to provide inputs to the control circuit 306 during setup and configuration of a motorized window treatment. The control circuit 306 may drive the motor 302 in a first direction at a constant rotational speed while a first button of the plurality of buttons 312 is pressed and held, and may drive the motor 302 in a second direction at a constant rotational speed while a second button of the plurality of buttons 312 is pressed.

The control circuit 306 may be configured to control the movement of the covering material in response to a covering movement command, e.g., from the communication signals received via the communication circuit 314 or the user inputs from the buttons 312. The covering movement command may consist of a command type (e.g., "move to a desired position" or "move at a constant rotational speed") and/or a desired position (e.g., to which the control circuit 306 may be configured to control the covering material). The desired position may be a preset position, a fully-open position, or a fully-closed position.

The motor drive unit 300 may receive power from an AC supply voltage $V_{AC}$ (e.g., 24 VAC) provided by an alternating-current (AC) power source (not shown). The AC supply voltage $V_{AC}$ may be provided to a full-wave rectifier bridge 320 for generating a bus voltage $V_{BUS}$ (e.g., 30 VDC), which may be filtered by a storage capacitor 318. The bus voltage $V_{BUS}$ may be provided to the H-bridge motor drive circuit 304 for driving the motor 302. A power supply 316 may receive the bus voltage $V_{BUS}$ and generate a DC supply voltage $V_{CC}$ (e.g., 5 VDC) for powering the low-voltage circuitry of the motor drive unit 300 (e.g., the control circuit 306, the memory 310, and the communication circuit 314).

Figure 4:
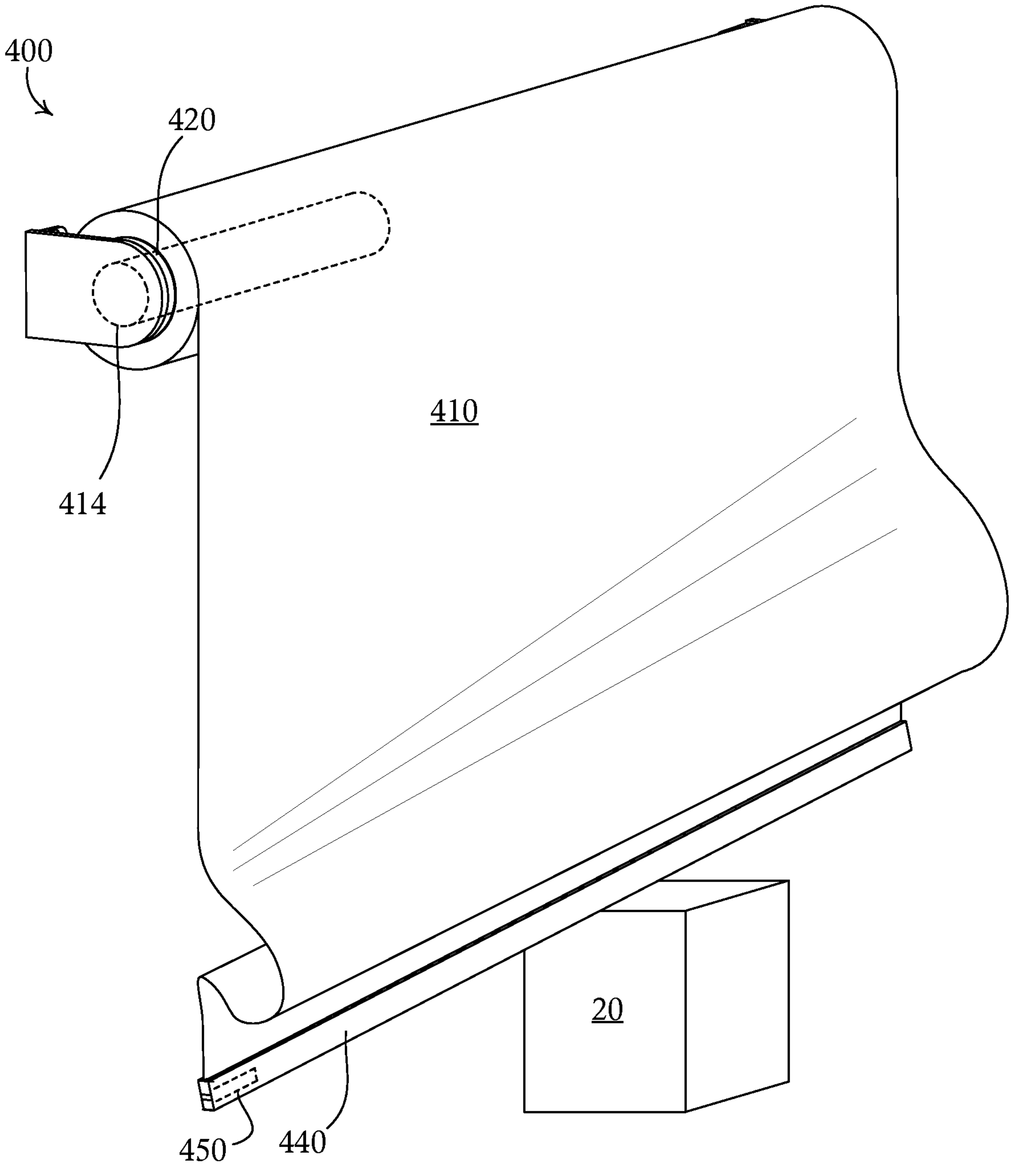
FIG. 4 illustrates a perspective view of a motorized roller shade having a hembar in a tilted state due to contact with an obstruction, in accordance with some embodiments.

FIG. 4 illustrates a motorized roller shade 400 (e.g., the motorized roller shade 100 of FIG. 1) having a hembar 440 in a non-level (e.g., undesired) tilt state. The term "tilt state" is used herein to refer to the current state of a hembar with respect to one or more axes. A hembar may have a "tilt state"

such as a "level tilt state" or a "non-level tilt state." As used herein, "level tilt state" refers to a hembar being in a desired (e.g., level or horizontal) state and "non-level tilt state" refers to a hembar being in an undesired (e.g., non-level, skew, etc.) state.

Figure 5:
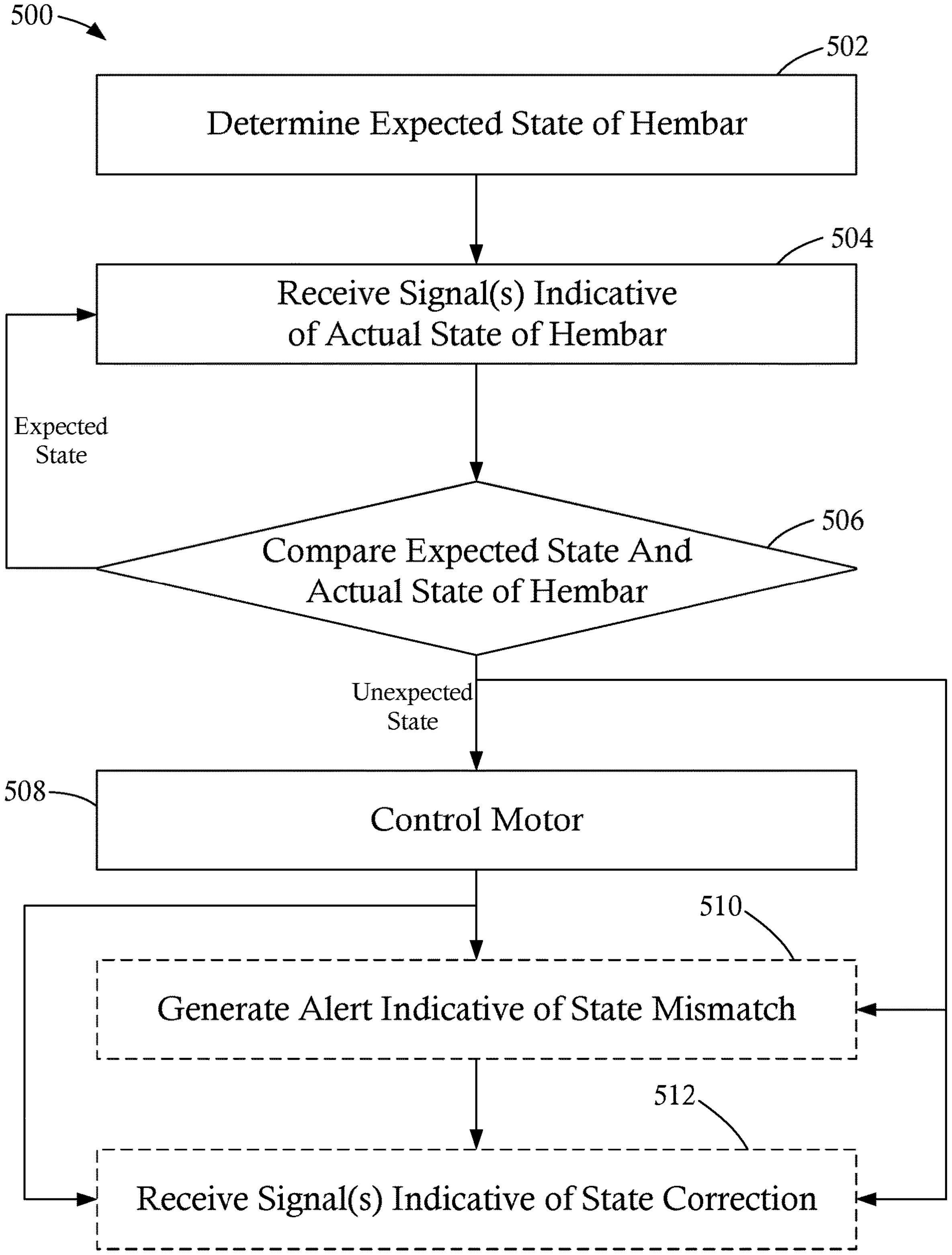
FIG. 5 is a flowchart illustrating a process of detecting and responding to an unexpected state of a hembar, in accordance with some embodiments.

FIG. 5 is a flowchart illustrating a process 500 of detecting and responding to the unexpected state of the hembar 440. The process 500 illustrated in FIG. 5 may be implemented by any suitable control element, such as, for example, a control circuit of a control module 450 in the hembar 440 (e.g., the control circuit 210 of the control module 200 depicted in FIG. 2), a control circuit of a motor drive unit 414 of the motorized roller shade 400 (e.g., the control circuit 306 of the motor drive unit 300 depicted in FIG. 3), and/or any combination of these control circuits.

At step 502, the control circuit may determine an expected state of the hembar 440. For example, the control circuit may generate one or more signals for controlling of at least one element of the motorized roller shade 400, such as, for example, the motor drive unit 414 (or a portion of the motor drive unit 414, such as a motor). The control circuit may be configured to determine the expected state of the motor in response to the signals for controlling the motor. The motor drive unit 414 may be configured to provide speed control and/or direction control of a motor, for example, as described in U.S. Pat. No. 7,281,565, entitled "System for controlling roller tube rotational speed for constant linear shade speed," published on Oct. 16, 2007, which is incorporated by reference herein in its entirety.

In addition, the control circuit may also be configured to determine the expected state of the hembar 440 at 502 in response to one or more first signals that may be indicative of operation of at least one element of the motorized roller shade 400 (e.g., the motor drive unit 414). The one or more signals may indicate rotation of a motor and/or a roller tube 420 in a first direction, rotation of the motor in a second direction (e.g., opposite the first direction of rotation), or no rotation. In some embodiments, the first signal may be a reference signal indicative of a fixed state of one or more elements of the motorized roller shade 400. For example, in some embodiments, a reference signal may be provided indicative of a level tilt state of the hembar 440. The reference signal may be set during a calibration procedure, as discussed in greater detail below.

At step 504, the control circuit may receive one or more second signals indicative of an actual (e.g., sensed or determined) state of the hembar 440. The one or more second signals may be generated by one or more state sensing circuits of the control module (e.g., the state sensing circuit 212 of the control module 200). For example, in various embodiments, one or more state sensing circuits may be configured to detect a tilt state of the hembar 440 in one or more planes, a movement state of the hembar 440 in one or more directions/planes, a relative height of the hembar 440 with respect to a surface (such as a window ledge), and/or any other suitable state of the hembar 440. For example, the control circuit of the control module 450 may directly receive the signals from the state sensing circuits of the control module 450. In addition, the control circuit of the control module 450 may transmit one or more signals indicating the state of the hembar 440 to the control circuit of the motor drive unit 414 (e.g., via the communication circuit 216).

As illustrated in FIG. 4, the hembar 440 may come in contact with an obstruction 20 placing the hembar 440 in a non-level tilt state with respect to the longitudinal axis of the roller tube 420. If the hembar 440 was moving at the time of contact, a movement state of the hembar 440 may indicate movement about a pivot point defined by the contact between the hembar 440 and the object 20. For example, in some embodiments, a first sensor, such as a Hall effect sensor, may generate a signal indicative of rotation of a motor and/or the roller tube 410 which may be used to determine the expected state of the hembar 440. A second sensor, such as the state sensing circuit 212, may generate a signal indicative of the linear movement of the hembar 440 within a predetermined plane. If the hembar 440 contacts the object 20, the linear movement of the hembar 440 as determined by the state sensing circuit may differ from the expected movement (e.g., as determined from the signals for controlling the motor and/or from the Hall effect sensor). It will be appreciated that any one or more suitable states may be detected by one or more state sensing circuits simultaneously, sequentially, and/or selectively.

At step 506, the control circuit may compare the expected state of the hembar 440 to the actual state of the hembar 440. In some embodiments, the control circuit may determine the expected state of the hembar 440 and the actual state of the hembar 440, for example, in response to the first signal and the second signal, respectively. The control circuit may determine the expected state and/or the actual state of the hembar 440 directly from the received signals and/or based on the received signals. For example, the second signal received from the state sensing circuit such as a tilt sensor may directly indicate a tilt state (e.g., level, non-level, etc.) of the hembar 440. As another example, the first signal may indicate that the motor drive unit 414 is rotating the roller tube 420 in a first direction (e.g., lowering the covering material 410) at a first rate, the expected state of the hembar 440 may include movement of the hembar 440 at the first rate. Similarly, the second signal received from the state sensing circuit may be used to determine a present direction and speed of the hembar 440, e.g., the actual state.

The control circuit may be configured to compare the expected state of the hembar 440 to the actual state. For example, in some embodiments, the hembar 440 may be expected to remain in a level tilt state with respect to a longitudinal axis defined by the roller tube 420. If the actual state of the hembar 440 indicates the hembar is in a non-level tilt state with respect to the longitudinal axis defined by the roller tube 420, a mismatch may be identified between the expected state (e.g., level tilt state) and the actual state (e.g., non-level tilt state). As another example, if the motor drive unit 414 is rotating the roller tube 420 in a first direction at a first rate, the expected state of the hembar 440 may be movement in a predetermined direction (e.g., closing or opening based on direction of the roller tube 420). If the hembar 440 is moving faster or slower than the expected rate, is not moving, or is moving in a direction other than the predetermined direction, the control circuit may identify a mismatch between the expected state (e.g., movement at a first rate in a predetermined direction) and the actual state (e.g., actual movement) of the hembar 440.

The control circuit may be configured to determine a match between the actual state and the expected state using any suitable tolerances and/or processes. For example, the control circuit may be configured to determine whether the expected state and the actual state are identical, whether the actual state is within some predetermined tolerance range with respect to the expected state, whether the actual state is one of a set of acceptable states for the expected state, etc. If the control circuit determines a state mismatch exists between the expected state and the actual state, the process 500 may proceed to step 508. If the control circuit determines that the expected state and the actual state match (or are within a predetermined tolerance), the process 500 may return to step 502 and the operation of the motorized roller shade 400 is continuously monitored.

At step 508, the control circuit may control the motor of the motor drive unit 414. For example, the control circuit of the motor drive unit 414 may drive (e.g., directly drive) the motor, for example, to start or stop operation of the motor, and/or operate the motor in an alternative fashion. In addition, the control circuit of the control module 450 may generate and transmit one or more control signals to the motor drive unit 414. The one or more control signals may be configured to control operation of the motor drive unit 414, for example, stopping operation of the motor, beginning operation of the motor, and/or operating the motor in an alternative fashion. For example, in some embodiments, the control circuit may turn the motor off, leaving the hembar 440 at a present position and in a present state. As another example, in some embodiments, the control circuit may reverse rotation of the motor.

In some embodiments, the control circuit may be configured to rectify the state mismatch between the expected state and the actual state of the hembar 440. For example, if the hembar 440 indicates unexpected movement, the one or more control signals may be configured to modify or stop operation of the motor drive unit 414 until the expected movement of the hembar 440 and the measured movement of the hembar 440 match. Stopping the movement of the hembar 440 has the advantage of preventing or minimizing any potential damage to the motorized roller shade 400. As another example, if the state sensing circuit of the control module 450 indicates a non-level tilt state of the hembar 440, the control circuit may be configured to reverse operation of the motor drive unit 414 to attempt to correct the non-level tilt state of the hembar 440.

In some embodiments, the control circuit may be configured to stop operation of the motor drive unit 414 while leaving the state mismatch unaddressed. For example, if the state sensing circuit of the control module 450 indicates a non-level tilt state, the control circuit may be configured to stop operation of the motor drive unit 414 until the hembar 440 indicates a level tilt state (e.g., is corrected by a user).

At optional step 510, the control circuit may generate an alert (e.g., a signal) indicative of the state mismatch of the hembar 440. The alert may be transmitted to a device, such as, for example, a device associated with a predetermined user (e.g., device associated with a building manager, a device associated with an owner, etc.). The device may deliver the alert to the predetermined user, who may service the motorized roller shade 400 to fix the issue that resulted in the state mismatch. For example, as illustrated in FIG. 4, the obstruction 20 may be located in a travel path of the motorized roller shade 400, causing both unexpected movement of the hembar 440 and a non-level tilt state of the hembar 440. A user may remove the obstruction 20 positioned in the travel path of the covering material 410, allowing the hembar 440 to return to a level tilt state and further allowing expected movement of the hembar 440.

At optional step 512, the control circuit may receive a signal indicating that the issue that caused the state mismatch has been resolved. For example, if the obstruction 20 that was preventing movement of the hembar 440 is removed from a travel path of the covering material 410, a signal may be generated (for example, by pushing a reset button in signal communication with the control circuit) indicating that the obstruction has been removed. The control circuit may enable normal rotation of the roller tube 420 in response to the received signal. In some embodiments, the control circuit may receive one or more additional signals from the one or more state sensing circuits of the control module 450 indicating that the hembar 440 is now in an expected state, indicating that issue has been resolved. For example, if the obstruction 20 that caused the non-level tilt state of the hembar 440 is removed from a travel path of the covering material 410, the hembar 440 will return to a level tilt state with respect to the longitudinal axis of the roller tube 420. The control circuit may enable normal rotation of the roller tube 420 in response to one or more signals indicating the hembar 440 is in an expected state. For example, in some embodiments, the control circuit may detect a brisk tug or other force applied to the hembar 440 and/or the covering material 410, such as the force applied by a user to operate/retract a spring-loaded roller shade.

Figure 6:
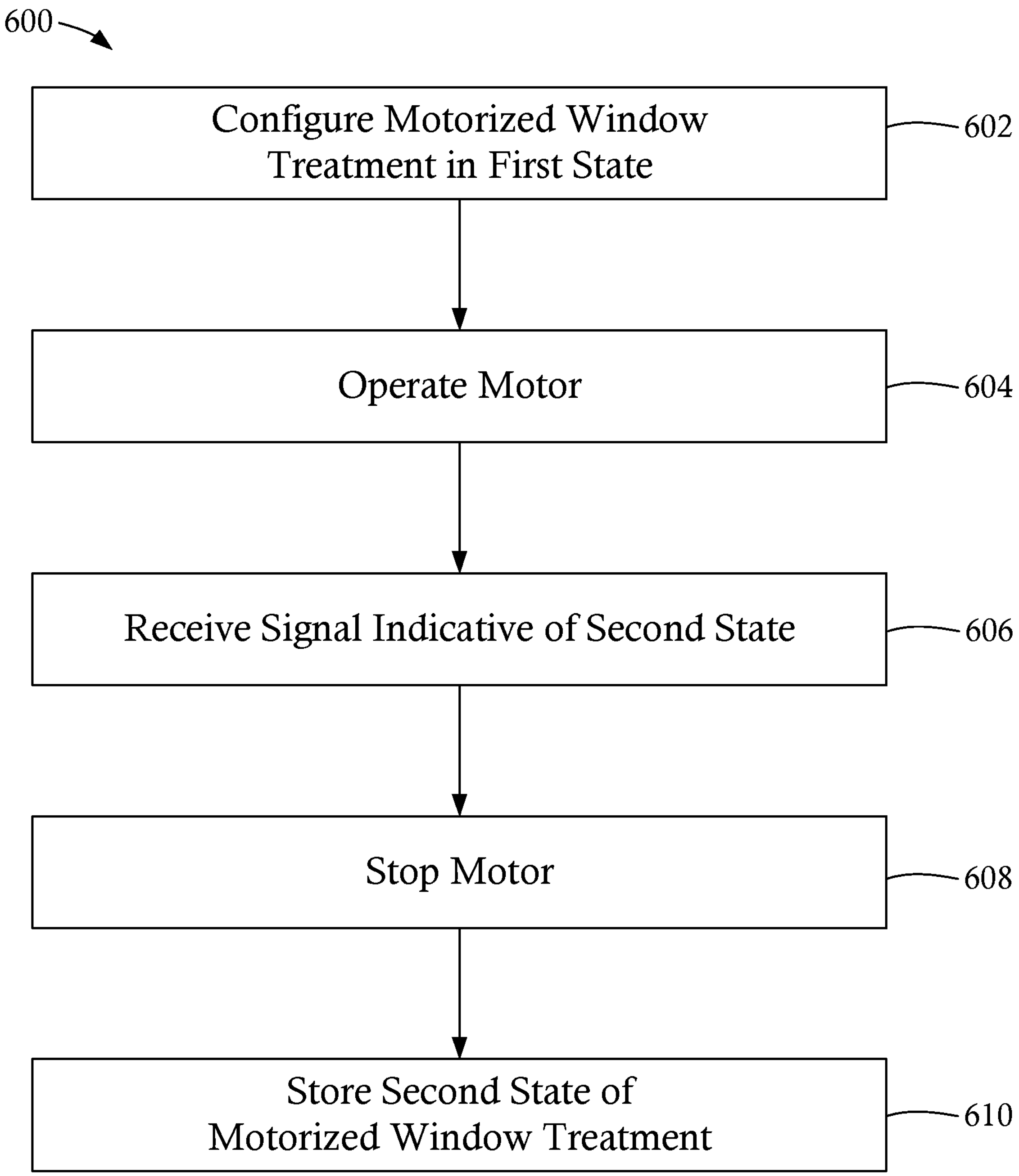
FIG. 6 is a flowchart illustrating a method of calibrating a motorized roller shade, in accordance with some embodiments.

FIG. 6 is a flowchart illustrating a process 600 of calibrating a motorized window treatment (e.g., the motorized roller shade 100 of FIG. 1 and/or the motorized roller shade 400 of FIG. 4), in accordance with some embodiments. Although the following description refers to the calibration being performed after installation, one of ordinary skill in the art will understand that such a calibration process may occur at a factory or on side prior to installation. The process 600 may be executed by a control circuit (e.g., the control circuit 306) of a motor drive unit (e.g., the motor drive units 114, 300, 414) of the motorized roller shade, a control circuit (e.g., the control circuit 210) of a control module (e.g., the control module 150, 200, 450) in a hembar (e.g., the hembar 140, 440) of the motorized roller shade, and/or any combination of these control circuits.

At step 602, the motorized window treatment may be positioned (e.g., installed) adjacent a window that may be covered by a covering material (e.g., the covering material 110, 410). The motorized window treatment may be placed in a first state, such as a fully retracted state (e.g., a fully-open position) or fully extended state (e.g., a fully-closed position). In some embodiments, in the fully retracted state, substantially all of the covering material may be wrapped around a roller tube (e.g., the roller tube 120, 420). In some embodiments, the control circuit of the motor drive unit may be configured to record or store the first state of the motorized window treatment, for example, in a memory (e.g., the memory 214).

At step 604, the control circuit may cause the motor drive unit to move the covering material (e.g., the covering material 110, 410) in a predetermined direction. For example, if the first state is a fully retracted state, the motor drive unit may be operated in a first direction configured to extend the covering material over a window positioned adjacent to the motorized window treatment. Similarly, if the first state is a fully extended state, the motor drive unit may be operated in a second direction configured to retract the covering material. The control signal may be generated by any suitable control mechanism, such as a control circuit of the motor drive unit, a control circuit of the control module, a remote control device, etc.

At step 606, the control circuit may receive a signal indicative of the motorized window treatment being in a second state. For example, in some embodiments, the hembar may contact a surface, such as, for example, a lower window surface or window sill, causing the state sensing circuit of the control module to generate a signal indicative of unexpected movement, indicating the hembar and the covering material fully cover the window. As another example, in some embodiments, the control circuit may receive a signal indicative of a maximum travel position (e.g., the fully retracted state) of the covering material. The signal may be generated by any suitable sensor, such as, for example, an open paddle sensor as described in U.S. Pat. No. 6,201,364, entitled "Motorized window shade system," published Mar. 13, 2001, which is incorporated by reference herein in its entirety.

At step 608, the control circuit may stop operation of the motor. At step 610, the control circuit may store the present position of the covering material as a fully closed position of the motorized window treatment. The position of the covering material may be stored using any suitable data measured and/or calculated from one or more operations of the motorized window treatment. For example, in some embodiments, the control circuit may be configured to receive a signal indicative of each rotation (or partial rotation) of the motor and/or roller tube. The control circuit may monitor the number of rotations (or partial rotations) that occur between the first state of the motorized window treatment until the signal indicative of the hembar contacting the surface is received at step 606. The number of rotations (or partial rotations) may be used to determine the full extension of the covering material and/or a partial extension position. As another example, in some embodiments, the control circuit may be configured to calculate a length of covering material extended based on one or more parameters such as, for example, speed of the motor, diameter of the roller tube, duration from the first state to receiving the signal from the hembar, and/or any other suitable parameters. The control circuit may store the present state of the covering material in any suitable format.

Figure 7:
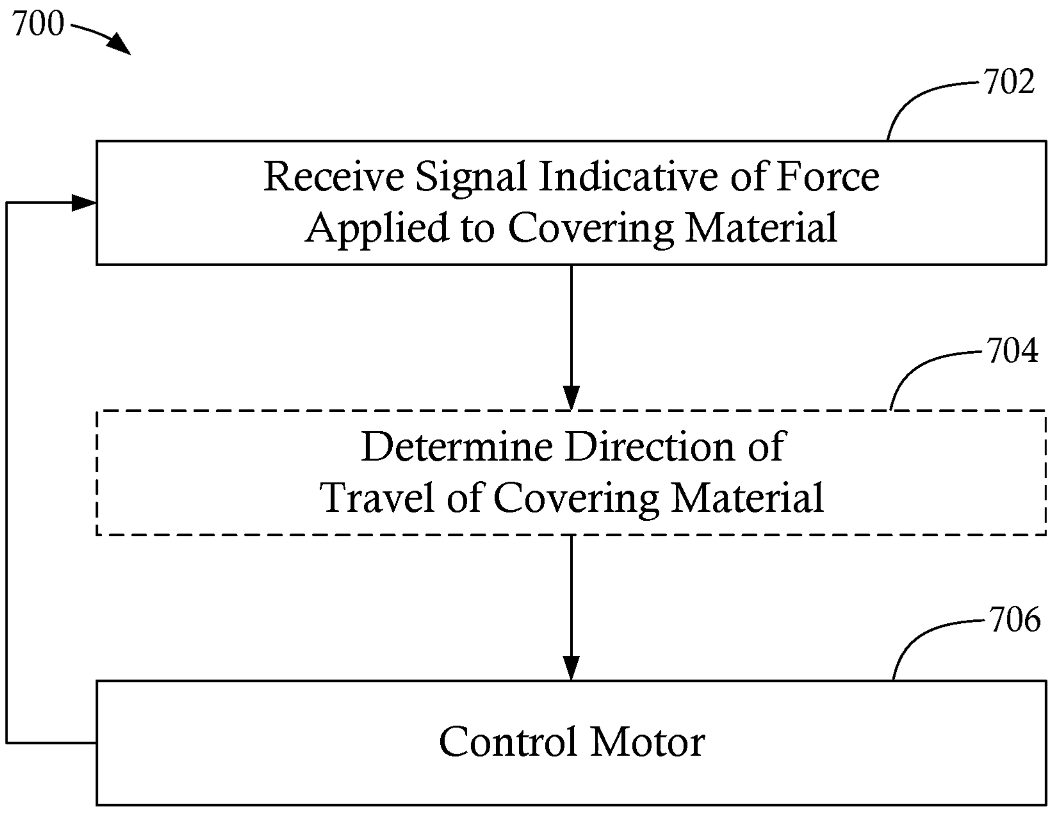
FIG. 7 is a flowchart illustrating a process of detecting and responding to a force applied to a covering material by a user, in accordance with some embodiments.

FIG. 7 is a flowchart illustrating a method 700 of operating a motorized window treatment (e.g., the motorized roller shade 100 of FIG. 1 and/or the motorized roller shade 400 of FIG. 4), in accordance with some embodiments. The process 700 may be executed by a control circuit (e.g., the control circuit 306) of a motor drive unit (e.g., the motor drive units 114, 300, 414) of the motorized window treatment, a control circuit (e.g., the control circuit 210) of a control module (e.g., the control module 150, 200, 450) in a hembar (e.g., the hembar 140, 440) of the motorized window treatment, and/or any combination of these control circuits. At step 702, the control circuit may receive a signal indicative of a force applied to a covering material (e.g., the covering material 110, 410) on a roller tube (e.g., the roller tube 120, 420). For example, a user of the motorized window treatment may tug on the covering material causing a force to be generated at the hembar. The force may be detected by one or more state sensing circuits of the control module in the hembar and transmitted to the control circuit of the motor drive unit. In some embodiments, the force may be detected as an unexpected movement of the hembar. For example, if the motor drive unit is not currently operating, there is no expected movement of the hembar. If movement is detected, the control circuit of the control module may be configured to determine if such movement is the result of a force applied by a user.

At optional step 704, the control circuit may determine a direction of travel for the covering material. For example, if a user tugs on the covering material, the user may intend for the covering material to be lowered or raised. The control circuit may be configured to determine a direction of travel based on one or more prior states of the motorized window treatment. In some embodiments, the one or more prior states may include a prior direction of travel of the covering material. The control circuit may be configured to select a direction of travel opposite of the prior direction of travel of the covering material. In some embodiments, the one or more prior states may include a present position of the covering material. If the covering material is extended (e.g., covering the window) beyond a predetermined threshold, the control circuit may select a direction of travel to retract the covering material. Similarly, if the covering material is not extended beyond a predetermined threshold, the control circuit may select a direction of travel to extend the covering material. It will be appreciated that the direction of travel of the covering material may be selected based on any one or more prior states of the motorized window treatment.

At step 706, the control circuit may start or stop operation of the motor of the motor drive unit. For example, when the control circuit detects a tug on the covering material, the control circuit may determine whether the motor of the motor drive unit is currently operating. If the motor is currently operating, the control circuit may cause the motor to stop. Alternatively, if the motor is not currently operating, the control circuit may cause the motor to begin operating to cause movement of the covering material in a direction selected at step 704.

As another example, in some embodiments, an additional sensor, such as an impact sensor (e.g., piezoelectric sensor), a proximity sensor (e.g., RF sensor), and/or any other suitable sensor may be used to trigger and/or stop operation of the motor. For example, in some embodiments, the control circuit may cause the motor drive unit to operate a motor until a sensor detects contact (or proximity) between the hembar and a second object, such as a window sill or other object. It will be appreciated that the devices, methods, and processes described herein can be combined and/or modified based to include elements of other devices, methods, and processes described herein.

Although embodiments are discussed herein with respect to a motorized roller shade 100, 400, it will be appreciated that the processes and methods discussed herein can be applied to any suitable motorized window treatment. For example, in various embodiments, the processes and methods disclosed herein may be applied to a motorized window covering, such as a cellular shade, e.g., as disclosed in U.S. Pat. No. 8,950,461, entitled "Motorized window treatment," issued on Feb. 10, 2015, which is incorporated by reference herein in its entirety.

Although the subject matter has been described in terms of exemplary embodiments, it is not limited thereto. Rather, the appended claims should be construed broadly, to include other variants and embodiments, which may be made by those skilled in the art.

What is claimed is:

1. A motorized window treatment, comprising:

a motor drive circuit for driving a motor;

a covering material having a first end affixed to a roller tube rotatable about a longitudinal axis of rotation and a second end movable along a first axis, wherein the covering material is configured to be extended along the first axis when the motor is operated in a first direction and retracted along the first axis when the motor is operated in a second direction;

a hembar coupled to the second end of the covering material;

at least one state sensing circuit coupled to the hembar, the at least one state sensing circuit configured to generate at least one first signal; and a control circuit in communication with the motor drive circuit and the at least one state sensing circuit, the control circuit configured to:

(i) determine an expected state of the hembar based at least in part on a determination that the motor drive circuit is driving the motor to move the covering material, (ii) determine whether the hembar is skew to the longitudinal axis of the roller tube, (iii) determine a present state of the hembar based on the at least one first signal generated by the at least one state sensing circuit, and (iv) compare the present state to the expected state;

wherein the motor drive circuit is configured to control the motor when a difference between the present state of the hembar and the expected state of the hembar are outside of a predetermined tolerance range.

2. The motorized window treatment of claim 1, wherein the determination that the motor drive circuit is driving the motor is made from at least one second signal comprising one or more signals for determining a rotational speed and direction of the motor.

3. The motorized window treatment of claim 2, wherein the at least one second signal is a fixed reference signal.

4. The motorized window treatment of claim 1, wherein the expected state of the hembar comprises movement of the hembar at a first rate in the first direction, and wherein the present state of the hembar comprises actual movement of the hembar.

5. The motorized window treatment of claim 1, wherein the expected state of the hembar comprises a level tilt state, and wherein the present state comprises a detected tilt state of the hembar.

6. The motorized window treatment of claim 1, wherein the control circuit is configured to receive at least one second signal, wherein the control circuit is configured to determine an updated present state of the hembar in response to the at least one second signal, and wherein the control circuit is configured to enable normal operation of the motor drive circuit when the updated present state and the expected state are the same.

7. The motorized window treatment of claim 6, wherein the at least one second signal is generated by a rotational position sensing circuit in signal communication with the motor drive circuit.

8. The motorized window treatment of claim 1, wherein the control circuit is configured to generate an alert when a difference between the present state and the expected state of the hembar are outside of the predetermined tolerance range.

9. The motorized window treatment of claim 1, wherein the motor drive circuit is configured to stop operation of the motor.

10. The motorized window treatment of claim 1, wherein the at least one state sensing circuit includes a first state sensing circuit and a second state sensing circuit.

11. The motorized window treatment of claim 10, wherein the first state sensing circuit is coupled to the hembar and the second state sensing circuit is spaced apart from the hembar.

12. The motorized window treatment of claim 10, wherein the first state sensing circuit is coupled to a first end of the hembar and the second state sensing circuit is coupled to a second end of the hembar.

13. The motorized window treatment of claim 1, wherein the at least one state sensing circuit is selected from a group consisting of: an accelerometer, a gyroscope, capacitive sensor, a microwave sensor, an ultrasonic sensor, an inductive sensor, a magnetic sensor, an optical sensor, a radar sensor, a sonar sensor, a fiber optic sensor, a Hall effect sensor, a piezoelectric sensor, a motion sensor, a proximity sensor, a force balance sensor, a micro-electrical-mechanical systems sensor, and a fluid-filled sensor.

14. The motorized window treatment of claim 1, further comprising a plurality of state sensing circuits spaced at predetermined intervals along a length of the hembar.

15. The motorized window treatment of claim 1, wherein a motor drive unit includes the control circuit and the motor drive circuit, the motorized window treatment further comprising:

a control module located in the hembar and housing the at least one state sensing circuit;

wherein the control module is configured to transmit a wireless signal to the control circuit of the motor drive unit in response to the at least one first signal generated by the at least one state sensing circuit.

16. The motorized window treatment of claim 1, further comprising:

a control module housing the at least one state sensing circuit and the control circuit, the control module further comprising a communication circuit in signal communication with the control circuit;

wherein the control circuit is configured to transmit a wireless signal to the motor drive circuit in response to the at least one first signal generated by the at least one state sensing circuit.

17. A method of operating a motorized window treatment, comprising:

receiving, by a control circuit, at least one first signal from a first state sensing circuit coupled to a hembar, the hembar being coupled to a covering material having a first end affixed to a roller tube rotatable about a longitudinal axis of rotation and a second end movable along a first axis;

determining, by the control circuit, whether the hembar is skew to the longitudinal axis of the roller tube, determining, by the control circuit, a present state of the hembar based on the at least one first signal;

determining, by the control circuit, an expected state of the hembar based on a determination that a motor drive circuit is driving a motor to move the covering material;

comparing the present state of the hembar to the expected state of the hembar; and controlling, by the motor drive circuit, operation of the motor when a difference between the present state of the hembar and the expected state of the hembar are outside of a predetermined tolerance range, wherein the motor is configured to move at least the second end of the covering material on the first axis.

18. The method of claim 17, comprising:

generating, by the control circuit, at least one second signal for controlling the motor; and determining, by the control circuit, the expected state of the hembar based on the at least one second signal.

19. The method of claim 17, wherein the present state comprises actual movement of the hembar, and wherein the expected state comprises expected movement of the hembar at a first rate in a first direction.

20. The method of claim 17, wherein the present state of the hembar comprises an actual tilt state of the hembar, and wherein the expected state comprises a level tilt state.

21. The method of claim 17, comprising:

receiving, by the control circuit, at least one second signal from a second state sensing circuit coupled to the hembar; and determining, by the control circuit, the expected state of the hembar based on the at least one second signal.

22. The method of claim 21, comprising:

receiving, by the control circuit, at least one third signal from the first state sensing circuit;

determining an updated present state of the hembar based on the at least one third signal;

controlling, by the motor drive circuit, operation of the motor when the expected state of the hembar and the updated present state of the hembar are the same.

23. The method of claim 17, comprising:

placing the motorized window treatment in a first predetermined state;

storing, by the control circuit, the first predetermined state;

controlling, by the motor drive circuit, operation of the motor to move the covering material in a first direction, wherein the control circuit is configured to receive at least one signal indicative of operation of the motor drive circuit;

receiving, by the control circuit, the at least one first signal from the first state sensing circuit indicative of a second predetermined state;

controlling, by the motor drive circuit, operation of the motor to stop movement of the covering material; and storing, by the control circuit, the second predetermined state of the motorized window treatment.

24. The method of claim 17, wherein the at least one first signal comprises a signal indicative of a force applied to the hembar.

25. The method of claim 24, comprising:

determining a direction of travel for the covering material, wherein the direction of travel is determined from a stored state of the motorized window treatment; and controlling, by the motor drive circuit, operation of the motor to move at least a second end of the covering material in the direction of travel.

26. The method of claim 25, wherein the stored state of the motorized window treatment is a prior direction of travel, and wherein the determined direction of travel is opposite the prior direction of travel.

27. A motorized window treatment, comprising:

a motor drive unit having a motor and a motor drive circuit for driving the motor;

a roller tube operatively coupled to the motor drive unit;

a covering material having a first end affixed to the roller tube, the roller tube being rotatable about a longitudinal axis of rotation and a second end movable along a first axis, wherein the covering material is configured to be extended along the first axis when the motor is operated in a first direction and retracted along the first axis when the motor is operated in a second direction opposite the first direction;

a hembar having a first end and a second end, the hembar coupled to the second end of the covering material;

at least one state sensing circuit coupled to the hembar, the at least one state sensing circuit configured to generate at least one first output signal indicative of a level state of the hembar, wherein the level state of the hembar indicates whether the first end of the hembar and the second end of the hembar are level with an axis of rotation of the roller tube or an unlevel state outside of a predetermined tolerance range; and a control circuit in communication with the motor drive circuit and the at least one state sensing circuit, the control circuit configured to:

(i) receive the first output signal from the at least one state sensing circuit, (ii) determine whether the hembar is skew to the longitudinal axis of the roller tube, (iii) determine whether the hembar is in the level state or the unlevel state based on the at least one first output signal generated by the at least one state sensing circuit, and (iv) responsive to a determination that the level state of the hembar is in the unlevel state outside of the predetermined tolerance range, cause the covering material to be retracted along the first axis by operating the motor in the second direction.

28. The motorized window treatment of claim 27, further comprising:

at least one motor sensing circuit configured to provide a second output signal indicative of an expected position of the hembar;

wherein the control circuit is configured to, responsive to a determination that the hembar is in the level state:

(v) receive the second output signal from the at least one motor sensing circuit;

(vi) determine, based on the first output signal, a present state of the hembar;

(vii) determine, based on the second output signal, an expected state of the hembar;

(viii) compare the determined present state of the hembar with the determined expected state of the hembar;

(ix) determine whether the present state of the hembar differs from the expected state of the hembar outside of the predetermined tolerance range; and (x) responsive to a determination that the present state of the hembar differs from the expected state of the hembar outside of the predetermined tolerance range, cause the covering material to be retracted along the first axis by operating the motor in the second direction.

29. The motorized window treatment of claim 28, wherein the expected state of the hembar includes a determination of an expected rate of movement of the hembar in a first direction, and wherein the present state of the hembar comprises a determination of an actual rate of movement of the hembar.

30. The motorized window treatment of claim 28, wherein the expected state of the hembar comprises a level state, and wherein the present state of the hembar comprises the detected level state of the hembar.

31. The motorized window treatment of claim 28, wherein the control circuit is configured to:

receive at least one third output signal;

determine an updated present state of the hembar based on the at least one third signal; and enable operation of the motor drive unit in the first direction and the second direction when the updated present state does not differ from the expected state outside of the predetermined tolerance range.

* * * * *